(12) United States Patent
Hong

(10) Patent No.: US 10,239,037 B2
(45) Date of Patent: Mar. 26, 2019

(54) MICROWAVE PLASMA TORCH

(71) Applicant: KOREA BASIC SCIENCE INSTITUTE, Daejeon (KR)

(72) Inventor: Yong-Cheol Hong, Goyang-si (KR)

(73) Assignee: KOREA BASIC SCIENCE INSTITUTE, Daejeon (KR)

( * ) Notice: Subject to any disclaimer, the term of this patent is extended or adjusted under 35 U.S.C. 154(b) by 205 days.

(21) Appl. No.: 15/126,829

(22) PCT Filed: Mar. 19, 2015

(86) PCT No.: PCT/KR2015/002702
§ 371 (c)(1),
(2) Date: Oct. 27, 2016

(87) PCT Pub. No.: WO2015/142091
PCT Pub. Date: Sep. 24, 2015

(65) Prior Publication Data
US 2017/0095787 A1 Apr. 6, 2017

(30) Foreign Application Priority Data
Mar. 19, 2014 (KR) ........................ 10-2014-0031927

(51) Int. Cl.
*B01J 19/08* (2006.01)
*H05H 1/30* (2006.01)

(52) U.S. Cl.
CPC .............. *B01J 19/088* (2013.01); *H05H 1/30* (2013.01); *B01J 2219/0805* (2013.01); *B01J 2219/0894* (2013.01)

(58) Field of Classification Search
None
See application file for complete search history.

(56) References Cited

U.S. PATENT DOCUMENTS 5,965,786 A * 10/1999 Rostaing .............. B01D 53/323
204/157.15
2003/0000823 A1* 1/2003 Uhm .................... B01D 53/323
204/157.43

FOREIGN PATENT DOCUMENTS

JP      07-142195       6/1995
JP      2004-537396    12/2004
(Continued)

OTHER PUBLICATIONS

International Search Report and Written Opinion issued in PCT/KR2015/002702, dated Jun. 15, 2015.

*Primary Examiner* — Kishor Mayekar
(74) *Attorney, Agent, or Firm* — Norton Rose Fulbright US LLP

(57) ABSTRACT

There is provided a microwave plasma torch system comprising: a plasma generator; a microwave generator; and at least one plasma source gas injector, wherein the microwave generator includes a waveguide, wherein the plasma generator includes a discharge tube, wherein the discharge tube passes through a waveguide in a perpendicular to the waveguide, wherein the waveguide has a width na, where n is an integer equal to or larger than 2, wherein a is defined as a width of a waveguide having a dominant mode for propagating a microwave, wherein the discharge tube is positioned relative to the waveguide such that a diameter center of the tube encounters a longitudinal null line of an electric field distribution, wherein the discharge tube is further positioned relative to the waveguide such that a diameter center of the tube encounters a transverse null line of an electric field distribution, wherein the transverse null line is perpendicular to the longitudinal null line.

9 Claims, 14 Drawing Sheets

(56) References Cited

FOREIGN PATENT DOCUMENTS

| JP | 2007-048718 | 2/2007 |
|----|-------------|--------|
| KR | 10-2011-0088658 | 8/2011 |
| KR | 10-2013-0092294 | 8/2013 |

* cited by examiner

Top view (prior art)

Top view

Side view (prior art)

Side view

End view (prior art)

End view

Position of Discharge Tube (prior art)     Position of Discharge Tube

MICROWAVE PLASMA TORCH

CROSS-REFERENCE TO RELATED APPLICATIONS

This application is a national phase application under 35 U.S.C. § 371 of International Application No. PCT/KR2015/002702 filed 19 Mar. 2015, which claims priority to Korean Patent Application No. 10-2014-0031927 filed 19 Mar. 2014. The entire contents of each of the above-referenced applications are incorporated into the present application by reference.

BACKGROUND

Field of the Present Disclosure

The present disclosure relates to a microwave plasma torch, and, more particularly, to a massive microwave plasma torch.

Discussion of Related Art

A microwave plasma torch has been widely employed. Korean Patent Number 10-1166444 discloses a plasma source gas torch using a microwave, and applications thereof, to heat a plasma source gas using a microwave to generate a pure plasma torch, and feed a hydrocarbon compound in a gas, liquid, or solid state to the generated plasma source gas plasma to produce a synthesized gas source. Further, Korean Patent Number 10-0375423 discloses a soot and smoke removal.

Such devices using the plasma torch have had various applications including fuel medications, synthesized gas source productions, soot and smoke removal, etc. when a reactant reacts with the plasma torch in the devices. Thus, the devices using the plasma torch may have potential applications.

A conventional device using the microwave plasma torch is shown in a left portion of FIG. 4.

As for the conventional device using the plasma torch, a rectangular waveguide has a waveguide width "a" and a waveguide height "b". As shown in a left portion of FIG. 4, a discharge tube passes through the waveguide in a perpendicular manner to an extension direction of the waveguide. In this connection, the waveguide width a and height b are dimensions of a rectangular waveguide having a dominant mode for propagation of the microwave having a specific frequency oscillated from a microwave generator.

The plasma torch generated from the conventional device has shortcomings that a specific frequency limits a plasma volume, and, thus, due to the limited plasma volume, the plasma torch has not applications requiring a massive plasma treatment.

Further, as for a temperature gradient in the torch, a temperature has a highest point in a central portion of the discharge tube, and is gradually lower toward an outer circumference of the discharge tube. This may lead to a pressure difference between the central portion and outer circumference of the discharge tube, which makes it difficult to inject a to-be-treated material into the torch.

In order to solve the above problem, there is a need for a massive microwave plasma torch with massive plasma treatment.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter.

The present disclosure is to provide a massive plasma torch by removing the shortcomings of the conventional device that a specific frequency limits a plasma volume.

Further, the present disclosure is to provide a massive plasma torch which makes it easy to inject the to-be-treated material into the torch, wherein the plasma torch has a temperature has a lower point in a central portion of the discharge tube, and a higher point in an outer circumference of the discharge tube.

In one aspect of the present disclosure, there is provided a microwave plasma torch system comprising: a plasma generator; a microwave generator configured to propagate a microwave to the plasma generator; and at least one plasma source gas injector configured to inject a plasma source gas to the plasma generator, wherein the microwave generator includes a waveguide configured to propagate the microwave to the plasma generator, wherein the plasma generator includes a discharge tube, wherein the discharge tube passes through a waveguide in a perpendicular to the waveguide, wherein the waveguide has a width na, where n is an integer equal to or larger than 2, wherein a is defined as a width of a waveguide having a dominant mode for propagating a microwave with a specific frequency from the microwave generator, wherein the discharge tube is positioned relative to the waveguide such that a diameter center of the tube encounters a longitudinal null line of an electric field distribution, wherein the discharge tube is further positioned relative to the waveguide such that a diameter center of the tube encounters a transverse null line of an electric field distribution, wherein the transverse null line is perpendicular to the longitudinal null line.

In one implementation, the plasma gas injector is oriented such the plasma gas therefrom is directed toward the longitudinal or transverse null line.

In one implementation, the plasma gas is injected in a swirled form.

In one implementation, the system further comprises a further injector configured to inject a to-be-treated material into the discharge tube, wherein the further injector is oriented such the material therefrom is directed toward the longitudinal or transverse null line.

In one implementation, the at least one plasma gas injector comprises a plurality of plasma gas injectors, wherein each of the plurality of plasma gas injectors is oriented such the plasma gas therefrom is directed toward each longitudinal or transverse null line, wherein the plurality of plasma gas injectors inject different gases.

In one implementation, the waveguide has a plunger fitted therein at a distal end thereof.

In one aspect of the present disclosure, there is provided a microwave plasma torch system comprising: a plasma generator; a microwave generator configured to propagate a microwave to the plasma generator; and at least one plasma source gas injector configured to inject a plasma source gas to the plasma generator, wherein the microwave generator includes a waveguide configured to propagate the microwave to the plasma generator, wherein the plasma generator includes a discharge tube, wherein the discharge tube passes through a waveguide in a perpendicular to the waveguide, wherein the waveguide has a width na, where n is an integer equal to or larger than 2, wherein a is defined as a width of a waveguide having a dominant mode for propagating a microwave with a specific frequency from the microwave generator, wherein the discharge tube has a diameter $(2n+1)\lambda/2$, wherein $\frac{1}{2}\lambda$ indicates a pitch between neighboring peaks of an electric field distribution, wherein a diameter center of the discharge tube coincides with a peak of the electric field distribution.

In one implementation, the plasma gas injector is oriented such the plasma gas therefrom is directed toward a longitudinal or transverse null line of the electric field distribution, wherein the transverse null line is perpendicular to the longitudinal null line.

In one implementation, the system further comprise a further injector configured to inject a to-be-treated material into the discharge tube, wherein the further injector is oriented such the material therefrom is directed toward the longitudinal or transverse null line of the electric field distribution, wherein the transverse null line is perpendicular to the longitudinal null line.

In one implementation, the at least one plasma gas injector comprises a plurality of plasma gas injectors, wherein each of the plurality of plasma gas injectors is oriented such the plasma gas therefrom is directed toward each longitudinal or transverse null line of the electric field distribution, wherein the transverse null line is perpendicular to the longitudinal null line, wherein the plurality of plasma gas injectors inject different gases.

In one implementation, the waveguide has a plunger fitted therein at a distal end thereof.

In one implementation, the system may further include an ignition unit, wherein the ignition unit is aligned with a peak of the electric field distribution in the discharge tube.

In one implementation, the system further comprise a further injector configured to inject a to-be-treated material into the discharge tube, wherein the further injector is configured to inject the material into the tube using a pressure higher than a pressure at a peak of the electric field distribution in the discharge tube.

In one implementation, the system further comprise a further injector configured to inject a to-be-treated material into the discharge tube, wherein the further injector is configured to inject the material into the tube using a pressure lower than a pressure at a peak of the electric field distribution in the discharge tube.

In accordance with the present disclosure, the shortcoming of the conventional device that the specific frequency limits the plasma volume has been removed. Further, the shortcoming that the temperature gradient in the conventional torch makes the to-be-treated material to be injected therein has been removed.

Further, in accordance with the present disclosure, the microwave plasma torch may have various applications including plasma gasification, waste gas purification or modification, nano-material synthesis, NOx production, etc. Moreover, in accordance with the present disclosure, the microwave plasma torch may enable the massive treatment.

BRIEF DESCRIPTION OF THE DRAWINGS

The accompanying drawings, which are incorporated in and form a part of this specification and in which like numerals depict like elements, illustrate embodiments of the present disclosure and, together with the description, serve to explain the principles of the disclosure.

Figure 1:
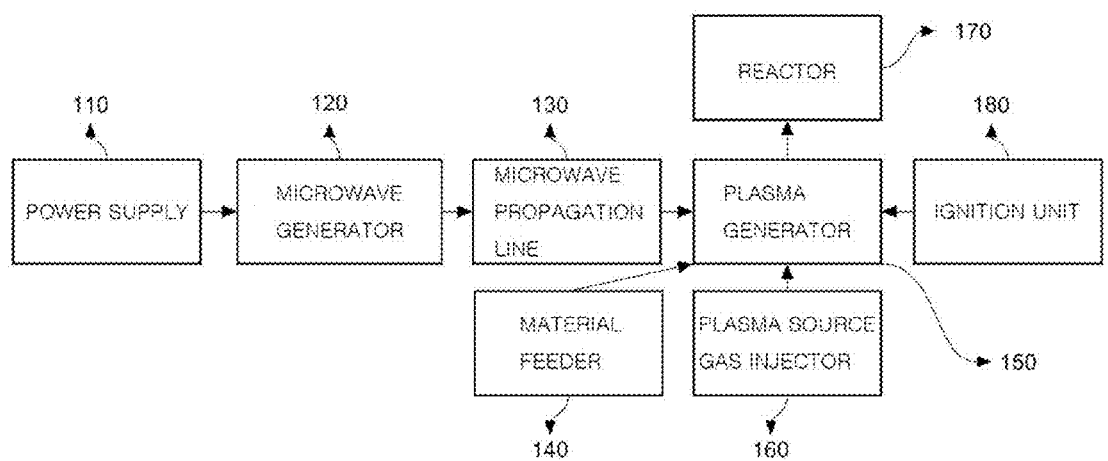
FIG. 1 is a high level block diagram of a reactor system using a plasma torch in accordance with one embodiment of the present disclosure.

For simplicity and clarity of illustration, elements in the figures are not necessarily drawn to scale. The same reference numbers in different figures denote the same or similar elements, and as such perform similar functionality. Also, descriptions and details of well-known steps and elements are omitted for simplicity of the description. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

DETAILED DESCRIPTIONS

Examples of various embodiments are illustrated and described further below. It will be understood that the description herein is not intended to limit the claims to the specific embodiments described. On the contrary, it is intended to cover alternatives, modifications, and equivalents as may be included within the spirit and scope of the present disclosure as defined by the appended claims.

It will be understood that, although the terms "first", "second", "third", and so on may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

It will be understood that when an element or layer is referred to as being "connected to", or "coupled to" another element or layer, it can be directly on, connected to, or coupled to the other element or layer, or one or more intervening elements or layers may be present. In addition, it will also be understood that when an element or layer is referred to as being "between" two elements or layers, it can be the only element or layer between the two elements or layers, or one or more intervening elements or layers may also be present.

Spatially relative terms, such as "beneath," "below," "lower," "under," "above," "upper," and the like, may be used herein for ease of explanation to describe one element or feature's relationship to another element s or feature s as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented for example, rotated 90 degrees or at other orientations, and the spatially relative descriptors used herein should be interpreted accordingly.

The terminology used herein is for the purpose of describing particular embodiments only and is not intended to be limiting of the present disclosure. As used herein, the singular forms "a" and "an" are intended to include the plural forms as well, unless the context clearly indicates otherwise. It will be further understood that the terms "comprises", "comprising", "includes", and "including" when used in this specification, specify the presence of the stated features, integers, s, operations, elements, and/or components, but do not preclude the presence or addition of one or more other features, integers, s, operations, elements, components, and/or portions thereof. As used herein, the term "and/or" includes any and all combinations of one or more of the associated listed items. Expression such as "at least one of" when preceding a list of elements may modify the entire list of elements and may not modify the individual elements of the list.

Unless otherwise defined, all terms including technical and scientific terms used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

In the following description, numerous specific details are set forth in order to provide a thorough understanding of the present disclosure. The present disclosure may be practiced without some or all of these specific details. In other instances, well-known process structures and/or processes have not been described in detail in order not to unnecessarily obscure the present disclosure.

As used herein, the term "substantially," "about," and similar terms are used as terms of approximation and not as terms of degree, and are intended to account for the inherent deviations in measured or calculated values that would be recognized by those of ordinary skill in the art. Further, the use of "may" when describing embodiments of the present disclosure refers to "one or more embodiments of the present disclosure."

A microwave plasma torch in accordance the present disclosure may remove the shortcoming of the conventional plasma torch that the specific frequency limits the plasma volume, thereby to provide a massive plasma torch. Further, in accordance the present disclosure, a discharge tube may be positioned to remove the shortcoming that the temperature gradient in the conventional torch makes the to-be-treated material to be injected therein.

FIG. 1 is a high level block diagram of a reactor system using a plasma torch in accordance with one embodiment of the present disclosure.

A plasma torch generator system may be referred to Korea Patent Number 10-0394994 assigned to the present applicant, which is herein incorporated by reference for all purposes thereof.

Referring to FIG. 1, a reactor system (which is referred to as a plasma torch system as used herein) using a plasma torch in accordance with one embodiment of the present disclosure may include a power supply 110, a microwave generator 120, a microwave propagation line (waveguide) 130, a plasma generator 150, and a plasma source gas injector 160. Further, the present system may further include a material feeder 140, reactor 170, and an ignition unit 180.

The power supply 110 may include a propagation voltage multiplier a pulse and DC device to supply a power to the microwave generator 120.

The microwave generator 120 may use a magnetron to oscillate a microwave in a band range of 10 MHz to 10 GHz. Preferably, the microwave generator 120 may oscillate 915 MHz and 2.45 GHz microwaves.

The microwave propagation line 130 may be embodied as a waveguide, which may propagate the microwave to the plasma generator 150.

The plasma generator 150 may include a discharge tube which passes through the microwave propagation line 130 at a distal end thereof. Thus, the discharge tube may define a plasma generation space using the microwave from the waveguide as the microwave propagation line 130. In this case, the discharge tube may pass through the waveguide substantially in a perpendicular to an extension of the waveguide.

Figure 2:
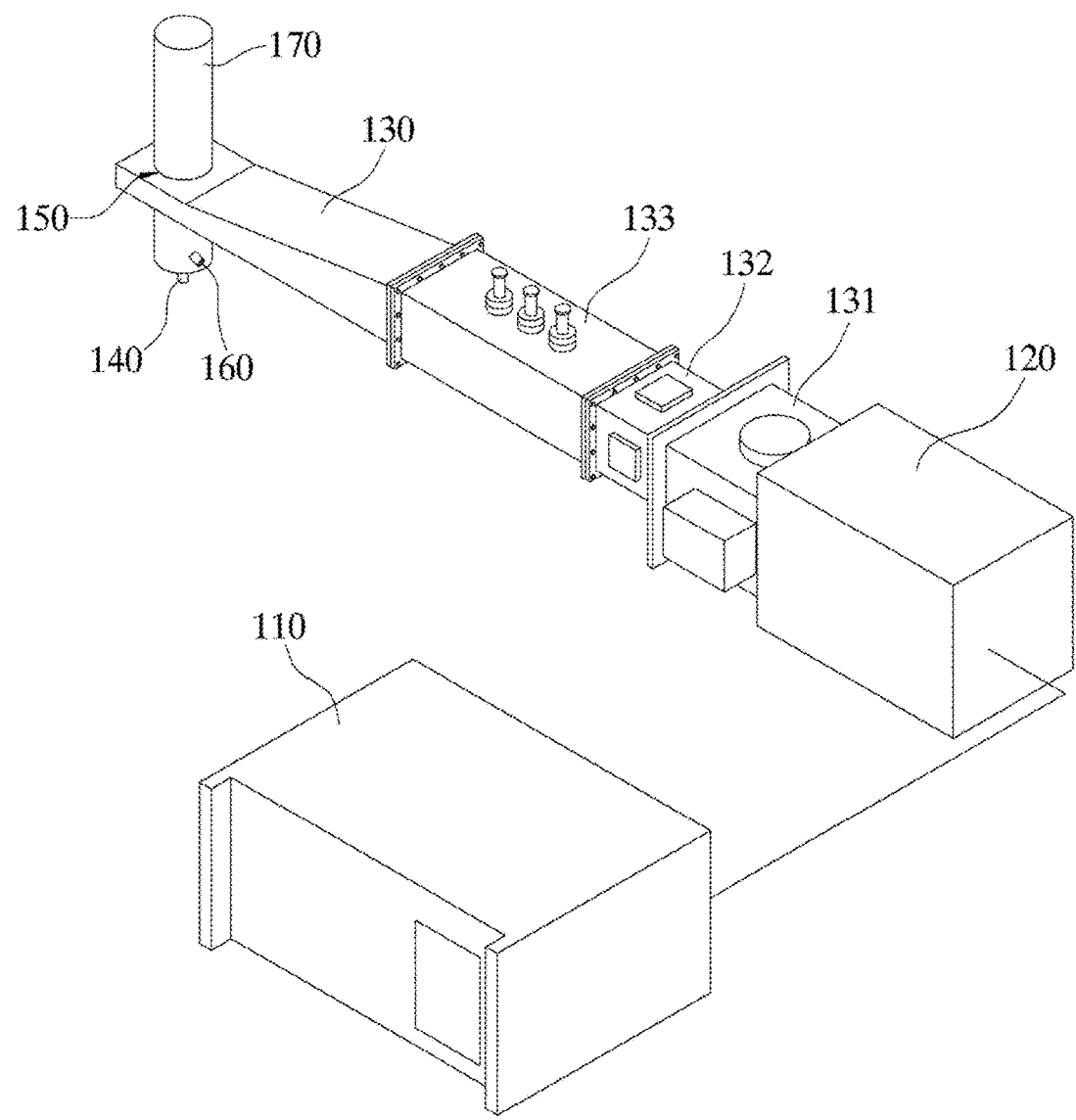
FIG. 2 is a perspective view of the reactor system using a plasma torch in accordance with one embodiment of the present disclosure.

FIG. 2 is a perspective view of the reactor system using a plasma torch in accordance with one embodiment of the present disclosure.

The power supply 110 may supply the power to the microwave generator 120. The microwave generator may generate the microwave. The generated microwave may propagate through a circulator 131, a directional coupler 132, a matching unit 133, and the microwave propagation line (waveguide) 130 to the plasma generator 150. While, in FIG. 2, the waveguide 130 is shown as tapered, the present disclosure is not limited thereto.

The plasma source gas may be injected to the plasma generator 150 via the plasma source gas injector 160. In this connection, the plasma source gas may be injected in a swirled form.

The plasma torch may be generated in the reactor 170 by the plasma source gas being fed to the plasma generator 150 and the waveguide 130 feeding the microwave to the plasma generator 150. A reactant may be fed via the material feeder 140 to any selected position in the plasma torch in the reactor 170.

Figure 3:
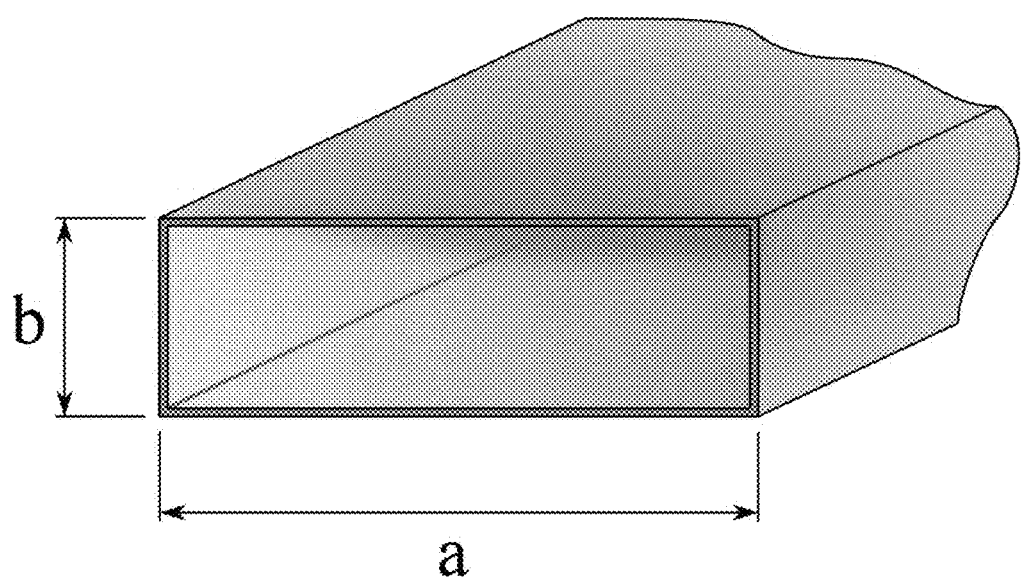
FIG. 3 is a diagram of one example of a rectangular waveguide.

The microwave plasma torch in accordance with the present disclosure is generated using a configuration that, when a width of a rectangular waveguide having a dominant mode for propagation of a microwave with a specific frequency oscillated from the microwave generator is a, the present rectangular waveguide has a width na (n is an integer equal to or larger than 2). The above configuration is based on the rectangular waveguide having a width "a" and height "b" as shown in FIG. 3.

As used herein, a term "dominant mode" may refer to a mode with the smallest degradation in the waveguide which supports at least one propagation mode. That is, the dominant mode may refer to a mode having the lowest cutoff frequency. As for the rectangular waveguide, the dominant mode is $TE_{10}$.

As used herein, a term "mode" may refer to a form in which energy is concentrated on a specific frequency in a certain structure. The mode in a resonator may refer to a resonance frequency and a resonance form thereof. As for a waveguide or propagation line, the mode may refer to a form in which the microwave with a specific frequency band propagates. The mode may be related to concentration of energy on the specific frequency based on s a structure characteristic. The mode may be determined by the form of the structure. Thus, in order to use a specific mode, the structure should be designed to allow energy with a target frequency to be converged to the specific mode.

A cutoff frequency of the present plasma torch may be as follows (the microwave only with a frequency equal to or higher than the cutoff frequency may be propagated to the waveguide):

$$\omega_{c,n0}=2f_{c,n0}=c[(n\pi/a)^2+(m\pi/b)^2]^{1/2}$$

where c indicates a light speed, a and b indicate a width and height of a rectangular waveguide respectively, and each of n and m indicates a mode number.

For example, when as for a WR 340 waveguide (86×43 mm²), the microwave has 2.45 GHz, $f_{c,10}$=about 1.8 GHz, and, thus, the microwave could be propagated to the WR340 waveguide. Further, in accordance with the present disclosure, a width "a" is increased at least two times, and, thus, the cutoff frequency is lowered, such that the microwave could be propagated to the WR340 waveguide. For example, when 3a is defined as the width of the present waveguide, the cutoff frequency is lowered to 0.6 GHz, such that the microwave could be propagated to the WR340 waveguide. This may be equally applied to 915 MHz, 5.8 GHz, etc. That is, in accordance with the present disclosure, in spite of the mode change, a plasma may be created for a given microwave frequency band.

Figure 4:
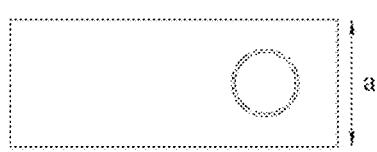
FIG. 4 illustrates arrangements of a waveguide and a discharge tube in a convention approach (left) and in the present disclosure (right) respectively.
Figure 4:
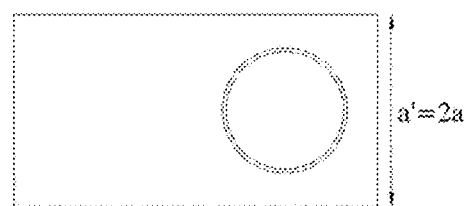
Figure 4:
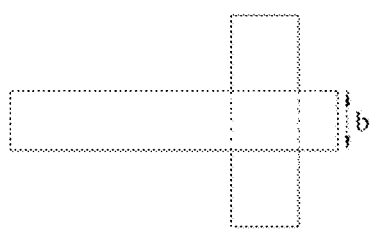
Figure 4:
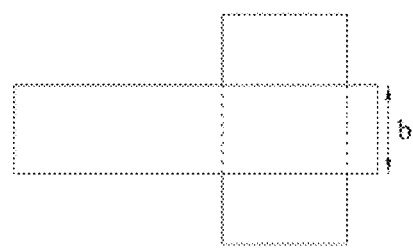
Figure 4:
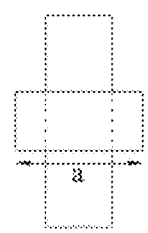
Figure 4:
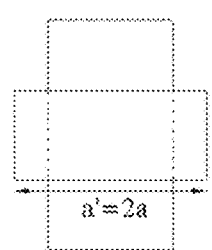
Figure 5:
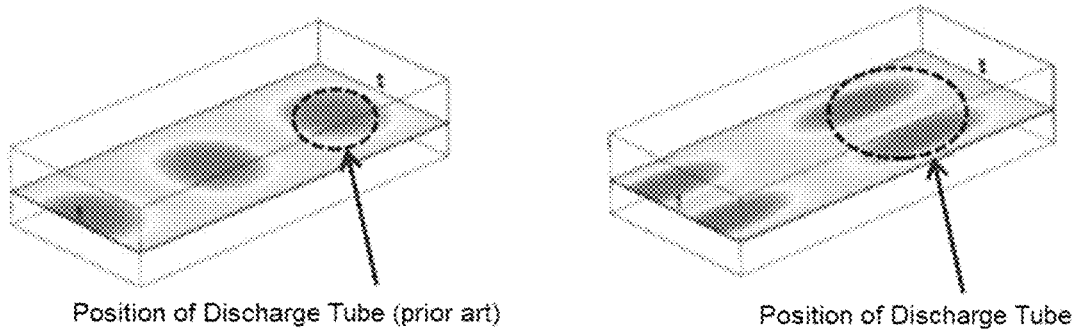
FIG. 5 illustrates positions of a discharge tube relative to a plasma torch in a convention approach (left) and in the present disclosure (right) respectively.
Figure 6:
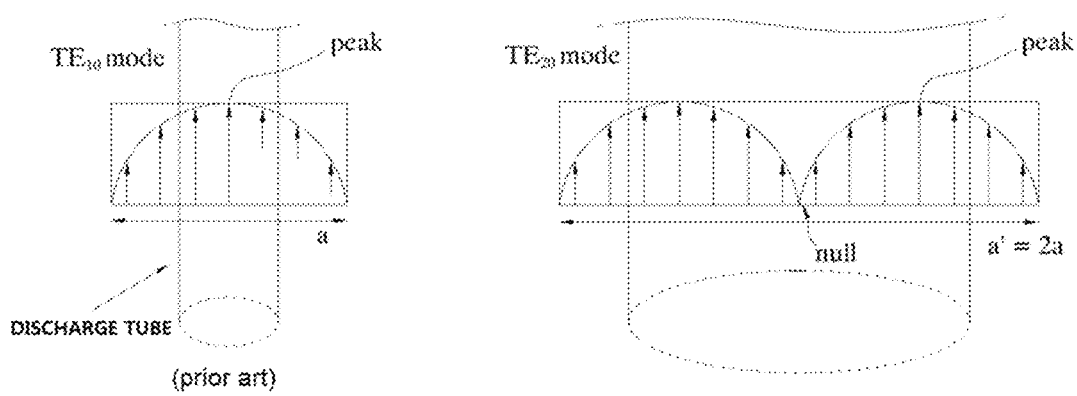
FIG. 6 illustrates positions of a discharge tube relative to a plasma torch in a convention approach (left) and in the present disclosure (right) respectively.
Figure 7:
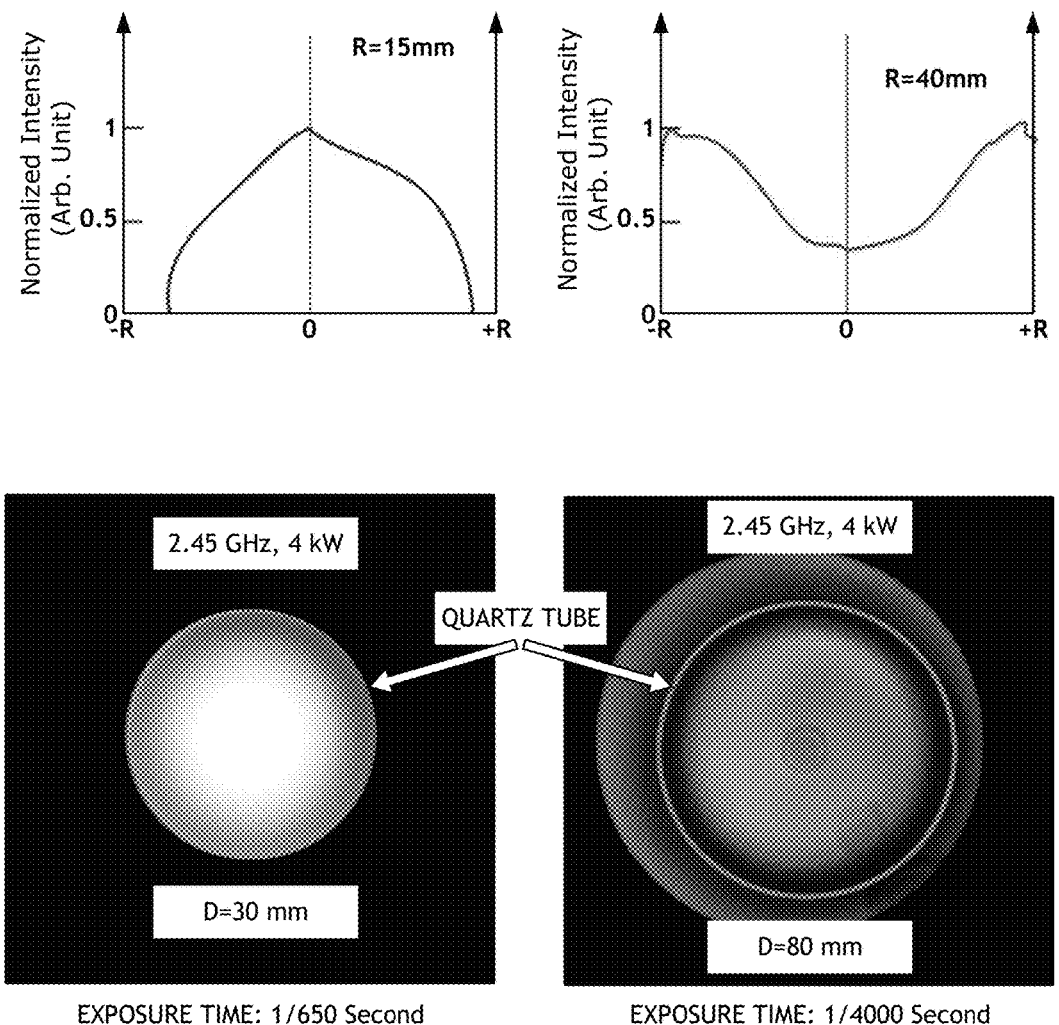
FIG. 7 illustrates images and intensities of plasma torches in a convention approach (left) and in the present disclosure (right) respectively.

FIG. 4 illustrates arrangements of a waveguide and a discharge tube in a convention approach (left) and in the present disclosure (right) respectively. FIG. 5 illustrates positions of a discharge tube relative to a plasma torch in a convention approach (left) and in the present disclosure (right) respectively. FIG. 6 illustrates positions of a discharge tube relative to a plasma torch in a convention approach (left) and in the present disclosure (right) respectively. FIG. 7 illustrates images and intensities of plasma torches in a convention approach (left) and in the present disclosure (right) respectively.

Referring to FIG. 4, top, middle, and bottom portions thereof respectively indicate top, side, and end views of arrangements of a waveguide and a discharge tube in a convention approach (left) and in the present disclosure (right) respectively.

The conventional waveguide has a width a and height b. The discharge tube may pass through the waveguide in a perpendicular manner to the waveguide. In this connection, the waveguide width a and height b are dimensions of a waveguide having a dominant mode for propagation of the microwave with a specific frequency from the microwave generator. In accordance with the present disclosure, in order to enable the microwave plasma torch to be massive, a width of the waveguide may be increased to a'=na (where n is an integer equal to or larger than 2). In this connection, when n is 1 to 2, exclusive, for example, 1.7, 1.8, etc., an electric field distribution may be disrupted or a degeneration mode may occur. Thus, n is an integer equal to or larger than 2. FIG. 4 shows one example where n=2, and, thus, the width is 2a. As shown in the side and end views, the discharge tube may have an increased diameter, thereby to create the massive plasma torch.

FIG. 5 shows waveguide modes and electric field distributions in a convention approach (left) and in the present disclosure (right) respectively. In this connection, the electric field distribution may have a contour line form.

As used therein, in the electric field distribution, positions having the substantially an equal electric field magnitude are shown by the same color or one contour line. The region with the highest electric field magnitude may refer to a peak, while the region with the lowest electric field magnitude may refer to a null. The nulls may be connected to each other to form a null line. The null line may be classified into a longitudinal null line extending in a waveguide longitudinal direction, and a transverse null line extending in a perpendicular to the waveguide longitudinal direction. As shown in FIG. 5, a red color indicates a peak region, while a yellow-green color indicate a null region.

The right portion of FIG. 5 shows the electric field distribution of the present torch where the present waveguide has the width 2a, wherein a width of a waveguide having a dominant mode for propagation of a microwave is defined to be a. The electric field distribution may render an arrangement of double rows in a waveguide width direction. In this connection, the present discharge tube may be positioned to contain therein the null region. It may be preferable that the null line encounters the center of the discharge tube. Thus, FIG. 5 shows a position of the present discharge tube (in a right portion thereof).

FIG. 6 details the positions of the discharge tube in a convention approach (left) and in the present disclosure (right) respectively. In the convention approach (left), as for a $TE_{10}$ mode as the dominant mode, the mode width is a. In the present disclosure (right), a $TE_{20}$ mode width is 2a.

FIG. 6 further details electric field distributions and diameters of the discharge tube based on the electric field distributions when the microwave has 2.45 GHz, in a convention approach (left) and in the present disclosure (right) respectively. As shown in FIG. 6, in accordance with the present disclosure, even when the discharge tube has a diameter at least two times larger than that of the conventional tube, the plasma may be substantially contained in the discharge tube. To the contrary, in the conventional approach, the diameter of the discharge tube may not exceed the width a.

In the conventional approach (left), when observing the electric field distribution from the distal end of the waveguide, the highest electric field magnitude is exhibited at a center of the waveguide width, which is a peak region of the electric field distribution. In this connection, the conventional discharge tube is positioned to be centered to the peak region. Thus, the electric field magnitude is the highest at the center of the discharge tube and is gradually lower toward the outer circumference of the discharge tube. In this way, when the to-be-treated material is fed to the discharge tube in the plasma torch, the to-be-treated material may be pushed toward the outer circumference of the discharge tube. Therefore, the injection of the to-be-treated material to the discharge tube in the plasma torch may be not facilitated. This may lead to poor treatment of the to-be-treated material.

To the contrary, in accordance with the present disclosure (right), the present waveguide has the width 2a. Thus, the electric field distribution may render an arrangement of double rows in a waveguide width direction. In this connection, the discharge tube is positioned such that the electric field magnitude is the highest at the outer circumference of the discharge tube and is the lowest at the center of the discharge tube. In other words, the discharge tube is positioned such that the null region of the electric field distribution is located at the center of the discharge tube. Thus, when the to-be-treated material is fed to the discharge tube in the plasma torch, the to-be-treated material may not be pushed toward the outer circumference of the discharge tube. That is, the shortcoming of the conventional device that the to-be-treated material is pushed toward the outer circumference of the discharge tube may be removed. This is because that the pressure of the plasma torch is lower in the center of the discharge tube than in the outer circumference of the tube. As a result, the injection of the to-be-treated material to the discharge tube in the plasma torch may be facilitated. This may lead to better treatment of the to-be-treated material.

FIG. 7 shows profiles of plasma emission strengths in the discharge tube in a convention approach (left) and in the present disclosure (right) respectively. In the convention approach (left), a camera exposure time is 1/650 sec 1.5 ms. In the present disclosure (right), a camera exposure time is 1/4000 sec 0.25 ms. Thus, the light exposure time is about 1/6 times shorter in the present disclosure than in the convention approach.

In the convention approach (left), when the discharge tube has a radius R, the plasma emission strength may be the highest at the center of the tube and may be lowered toward the outer circumference. From an actual image, it may be confirmed that it is brightest at the center of the tube.

In the present approach (right), when the discharge tube has a radius R, the plasma emission strength may be the lowest at the center of the tube and may be the highest in the outer circumference. From an actual image, it may be confirmed that it is brightest in the outer circumference of the tube.

In this case, a diameter of a quartz tube as the discharge tube is 30 mm in the convention approach (left) and is 80 mm in the present approach (right). That is, in the present disclosure, the discharge tube has an increased diameter and thus the plasma is filled entirely therein, thereby to produce a massive plasma torch.

Hereinafter, positioning of the discharge tube relative to the waveguide in accordance with the present disclosure will be described in details.

Figure 8A:
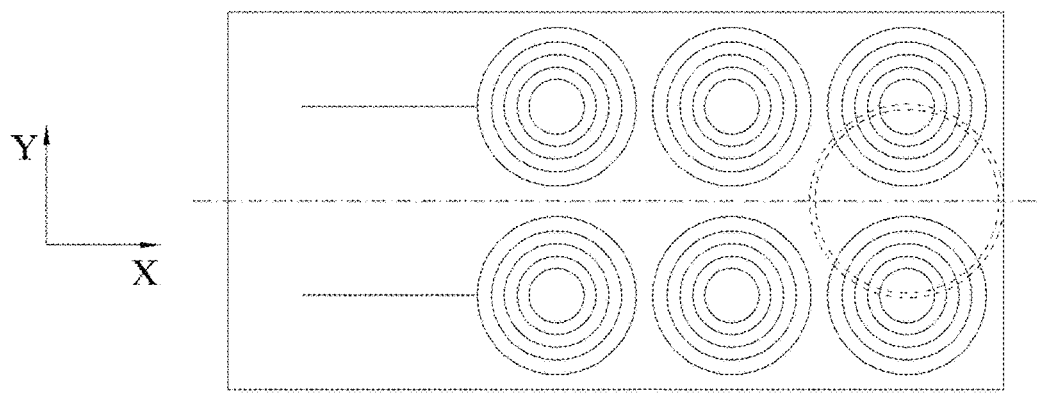
FIGS. 8A to 8B illustrate portions of a discharge tube relative to a plasma torch in accordance with the present disclosure.
Figure 8B:
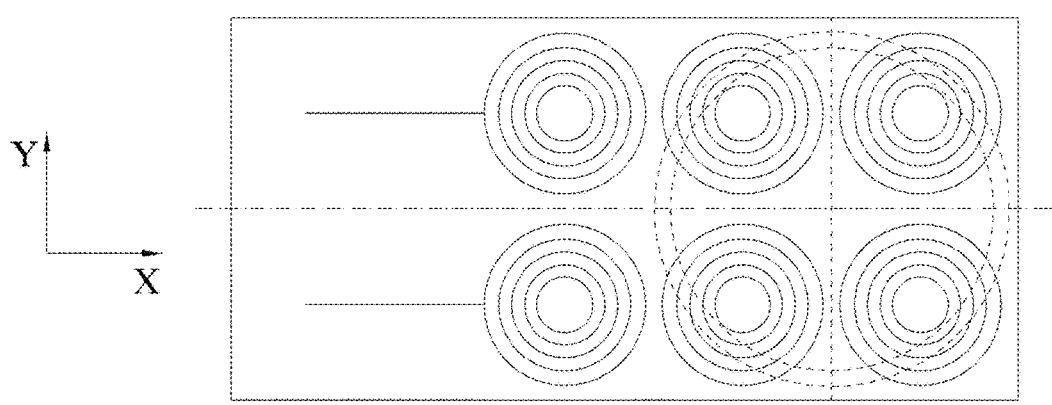

When an electric field distribution is shown in FIG. 8A and FIG. 8B, and, for example a'=2a, and, thus, the electric field distribution renders an arrangement of double rows in a waveguide width direction, the present discharge tube may be positioned as follows:

The present disclosure is to remedy the problem that in the conventional plasma torch, the temperature and pressure are the highest in a central region of a discharge tube, which makes it difficult to inject the to-be-treated material into the tube. Therefore, the discharge tube may be positioned relative to the waveguide such that the tube contains, at a central region thereof, the longitudinal or transverse null line of the electric field distribution. Thus, the discharge tube contains the lowest temperature and pressure region therein. In turn, the to-be-treated material may be injected into the null line, which may make it easy to inject the to-be-treated material into the tube. Preferable embodiments will be described with reference to FIGS. 8A-8B below.

As shown in FIG. 8A, when the electric field distribution renders an arrangement of double rows in a waveguide width direction and the longitudinal null line thereof is indicated by a dot-dashed line, the discharge tube is positioned such that a center of the discharge tube encounters the longitudinal null line. Two dashed circular lines indicate positions of the discharge tube, wherein an inner dashed circular line indicates a position of the discharge tube when a wall of the discharge tube encounters the highest electric field magnitude, and an outer dashed circular line indicates a position of the discharge tube when a wall of the discharge tube slightly deviates from the highest electric field magnitude. For both positions, the discharge tube is positioned such that a center of the discharge tube encounters the longitudinal null line (X direction) of the electric field distribution. More preferably, the discharge tube may be positioned adjacent to the distal end of the waveguide. This is shown as FIG. 8A.

In an alternative, as shown in FIG. 8B, the discharge tube is positioned such that a center of the discharge tube encounters not only the longitudinal null line (X direction) but also a transverse null line (Y direction) of the electric field distribution. Similarly, two dashed circular lines indicate positions of the discharge tube, wherein an inner dashed circular line indicates a position of the discharge tube when a wall of the discharge tube encounters the highest electric field magnitude, and an outer dashed circular line indicates a position of the discharge tube when a wall of the discharge tube slightly deviates from the highest electric field magnitude. For both positions, the discharge tube is positioned such that a center of the discharge tube encounters not only the longitudinal null line (X direction) but also a transverse null line (Y direction) of the electric field distribution. More preferably, the discharge tube may be positioned adjacent to the distal end of the waveguide. This is shown as FIG. 8B.

In an further alternative, the discharge tube has a diameter $(2n+1)\lambda/2$, wherein $\frac{1}{2}\lambda$ indicates a pitch between neighboring peaks of an electric field distribution, wherein a diameter center of the discharge tube coincides with a peak of the electric field distribution.

Hereinafter, positioning of the plasma gas injector and to-be-treated material injector will be described in details.

Figure 9:
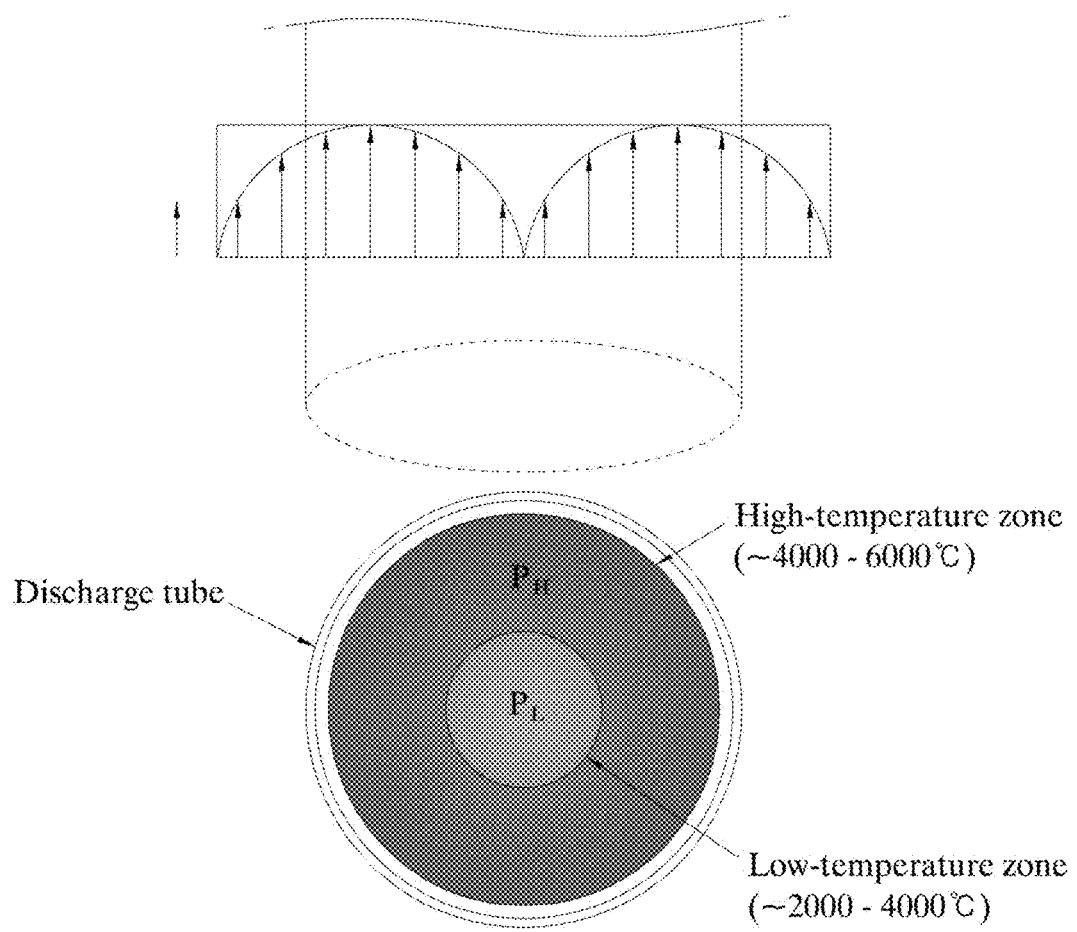
FIG. 9 illustrates a pressure and temperature gradient of a plasma torch in a discharge tube in accordance with the present disclosure.

As shown in FIG. 9, when the discharge tube is positioned relative to the waveguide as described above in the present approach, the electric field energy is higher in the outer circumference of the discharge tube than in the center thereof. Thus, the electric field distribution may be divided into a high pressure region $P_H$ and a low pressure region $P_L$ when viewed from above. The pressure region $P_H$ has a higher temperature than that of the low pressure region $P_L$ ($P_H > P_L$). The center region of the tube corresponds to the low pressure region $P_L$. The outer circumference of the tube corresponds to the high pressure region $P_H$. That is, the pressure is lower in the center of the discharge tube. Thus, injection of the swirled gas to the center of the discharge tube may be easier. Further, injection of the to-be-treated material to the center of the discharge tube may be easier. However, in the conventional approach, this is reverse. That is, the center region of the tube corresponds to the high pressure region $P_H$. The outer circumference of the tube corresponds to the low pressure region $P_L$.

Figure 13A:
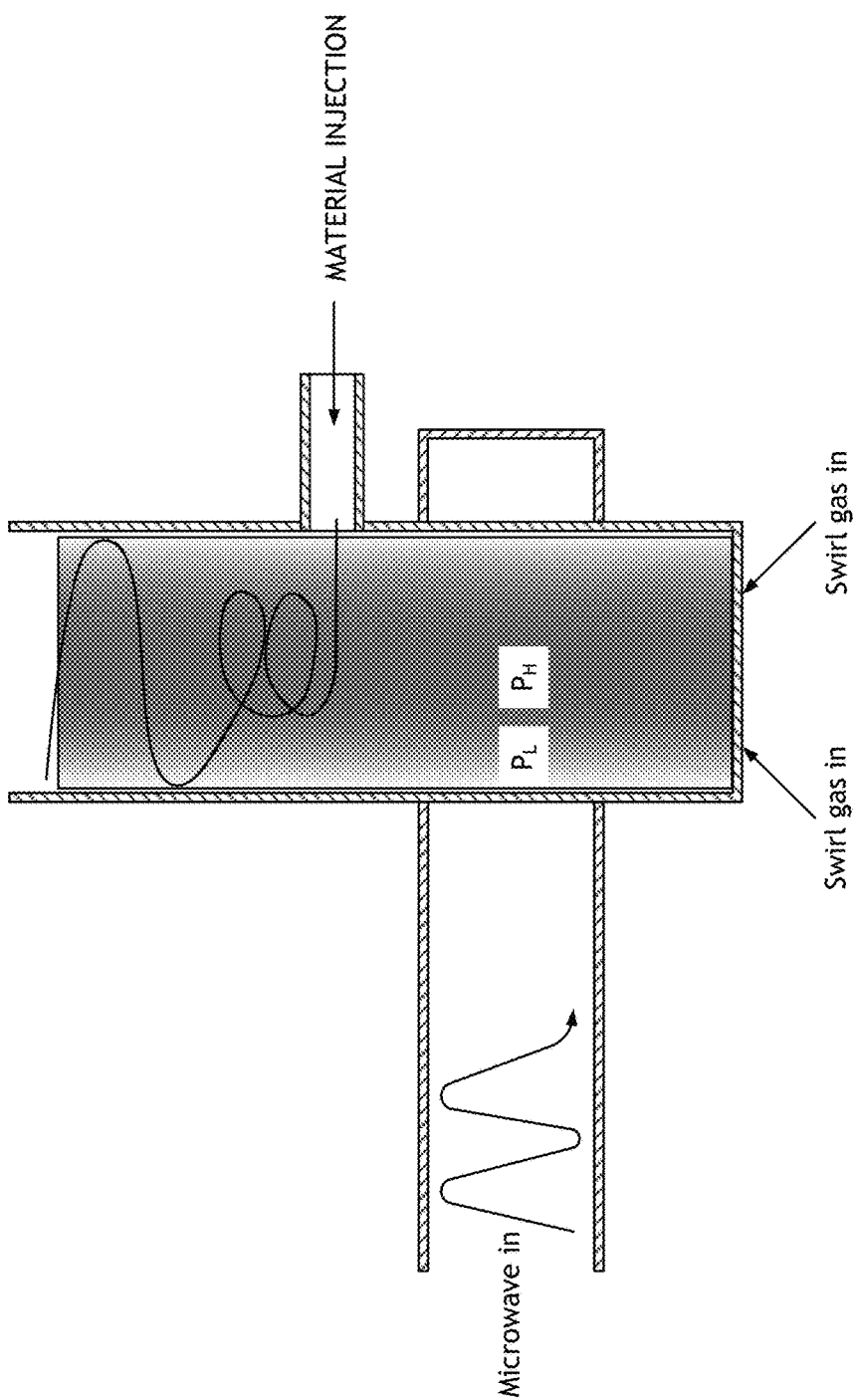
FIGS. 13A and 13B illustrate reaction progresses of a to-be-treated material when the to-be-treated material is injected into a discharge tube using a pressure higher than a pressure at a peak region of an electric field distribution in a convention approach and in the present disclosure respectively.
Figure 13B:
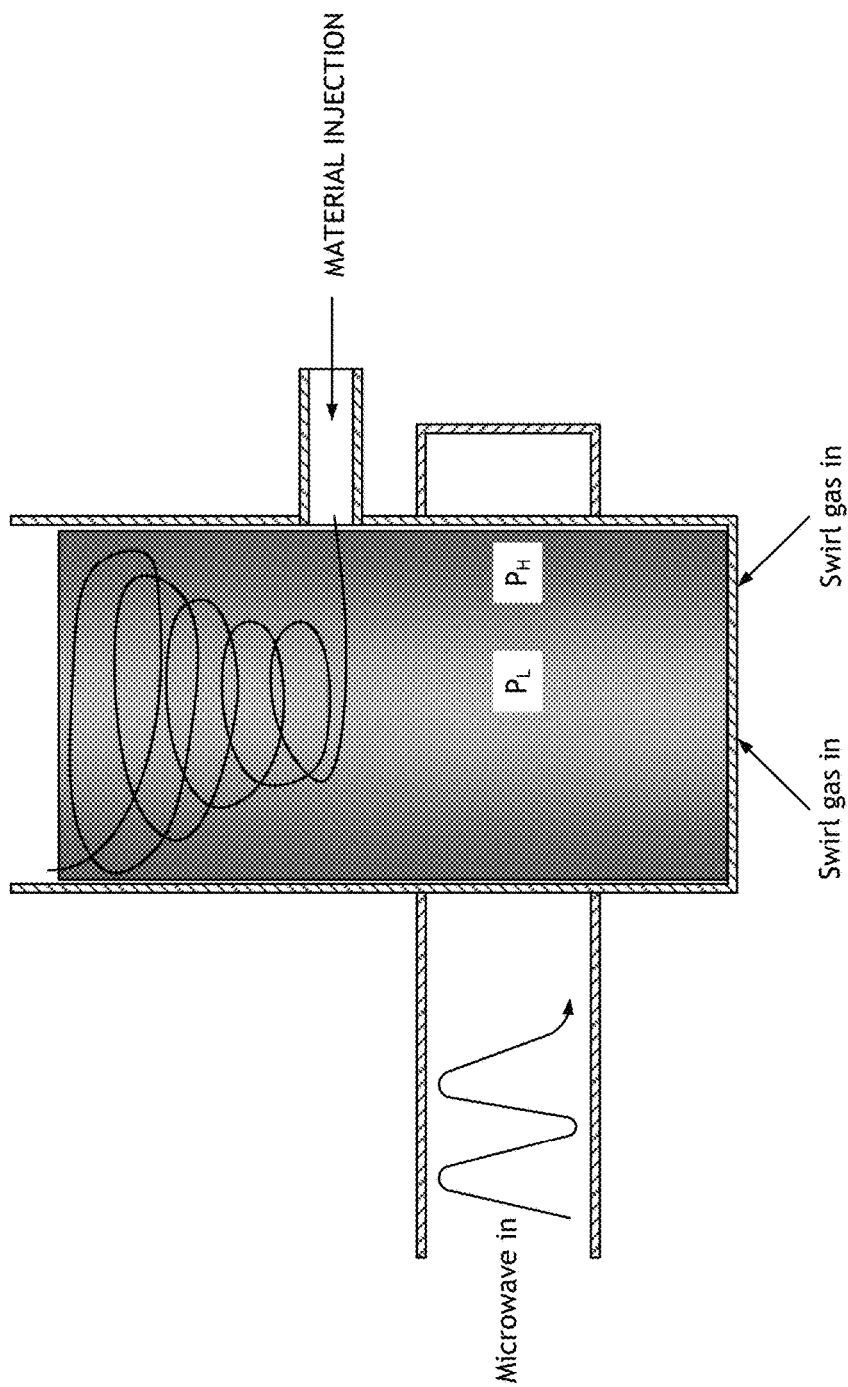

FIGS. 13A and 13B illustrate reaction progresses of a to-be-treated material when the to-be-treated material is injected into a discharge tube using a pressure higher than a pressure at a peak region of an electric field distribution in a convention approach and in the present disclosure respectively.

FIG. 13A illustrates reaction progresses of a to-be-treated material when the to-be-treated material is injected into a discharge tube using a pressure higher than a pressure at a peak region of an electric field distribution in a convention approach. The center region of the tube corresponds to the high pressure region $P_H$. The outer circumference of the tube corresponds to the low pressure region $P_L$. In this connection, the to-be-treated material is injected into the discharge tube using a pressure higher than the pressure $P_H$. As shown in FIG. 13A, the to-be-treated material enters into the center of the discharge tube and, immediately, move to the outer region (lower temperature region) and circles only around the outer region. That is, the reaction duration in which the to-be-treated material reacts using the high temperature region may be shortened. Thus, the reaction rate of the to-be-treated material may be lowered.

FIG. 13B illustrates reaction progresses of a to-be-treated material when the to-be-treated material is injected into a discharge tube using a pressure higher than a pressure at a peak region of an electric field distribution in the present approach. The center region of the tube corresponds to the low pressure region $P_L$. The outer circumference of the tube corresponds to the high pressure region $P_H$. In this connection, the to-be-treated material is injected into the discharge tube using a pressure higher than the pressure $P_H$. As shown in FIG. 13B, the to-be-treated material enters into the center of the discharge tube and move to the outer region (high temperature region) and circles around the outer region for a long time. In this connection, the outer region of the tube acts as the high pressure region and high temperature region to confine the to-be-treated material therein. This may lead to better reaction rate of the to-be-treated material. That is, the reaction duration in which the to-be-treated material reacts using the high temperature region may be longer. Thus, the reaction rate of the to-be-treated material may be raised.

Figure 14A:
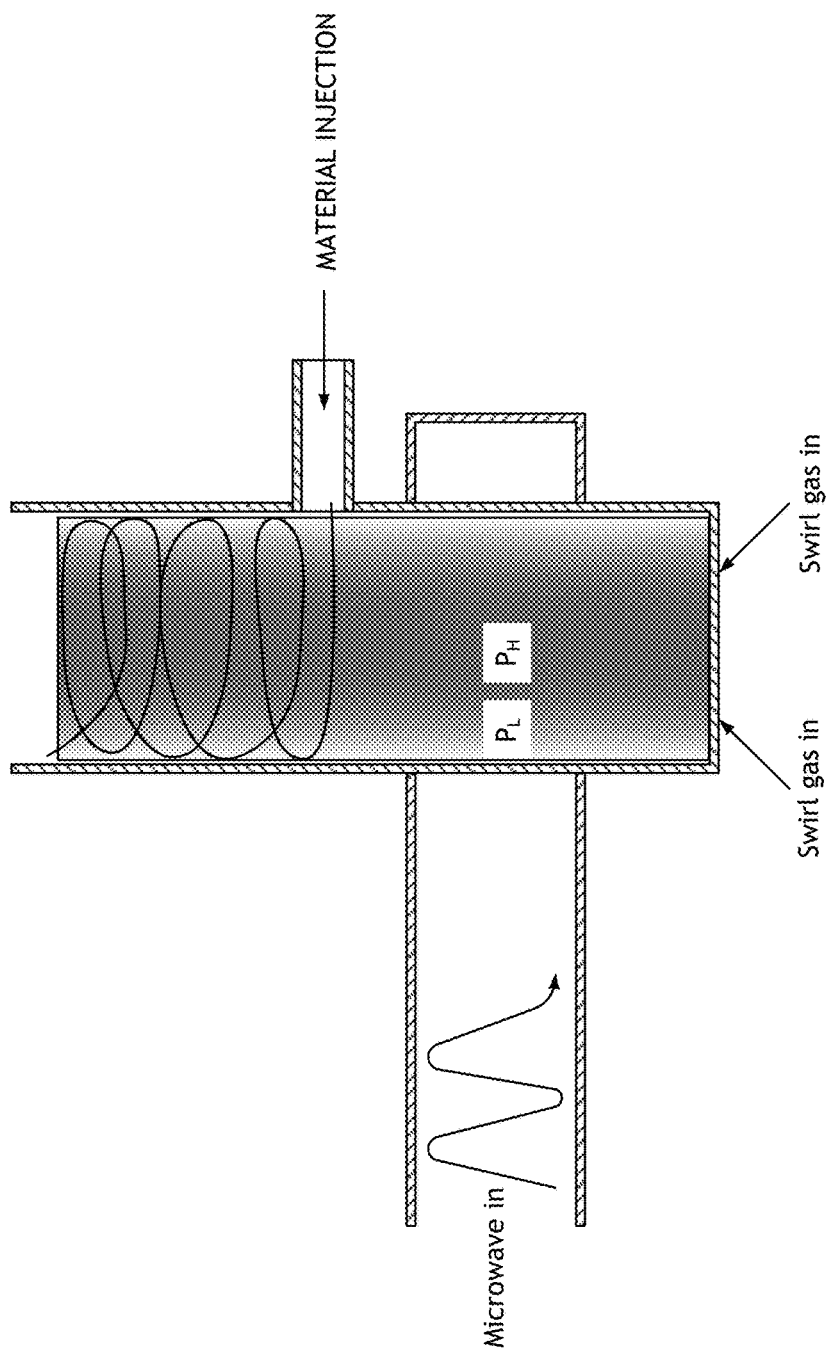
FIGS. 14A and 14B illustrate reaction progresses of a to-be-treated material when the to-be-treated material is injected into a discharge tube using a pressure lower than a pressure at a peak region of an electric field distribution in a convention approach and in the present disclosure respectively.
Figure 14B:
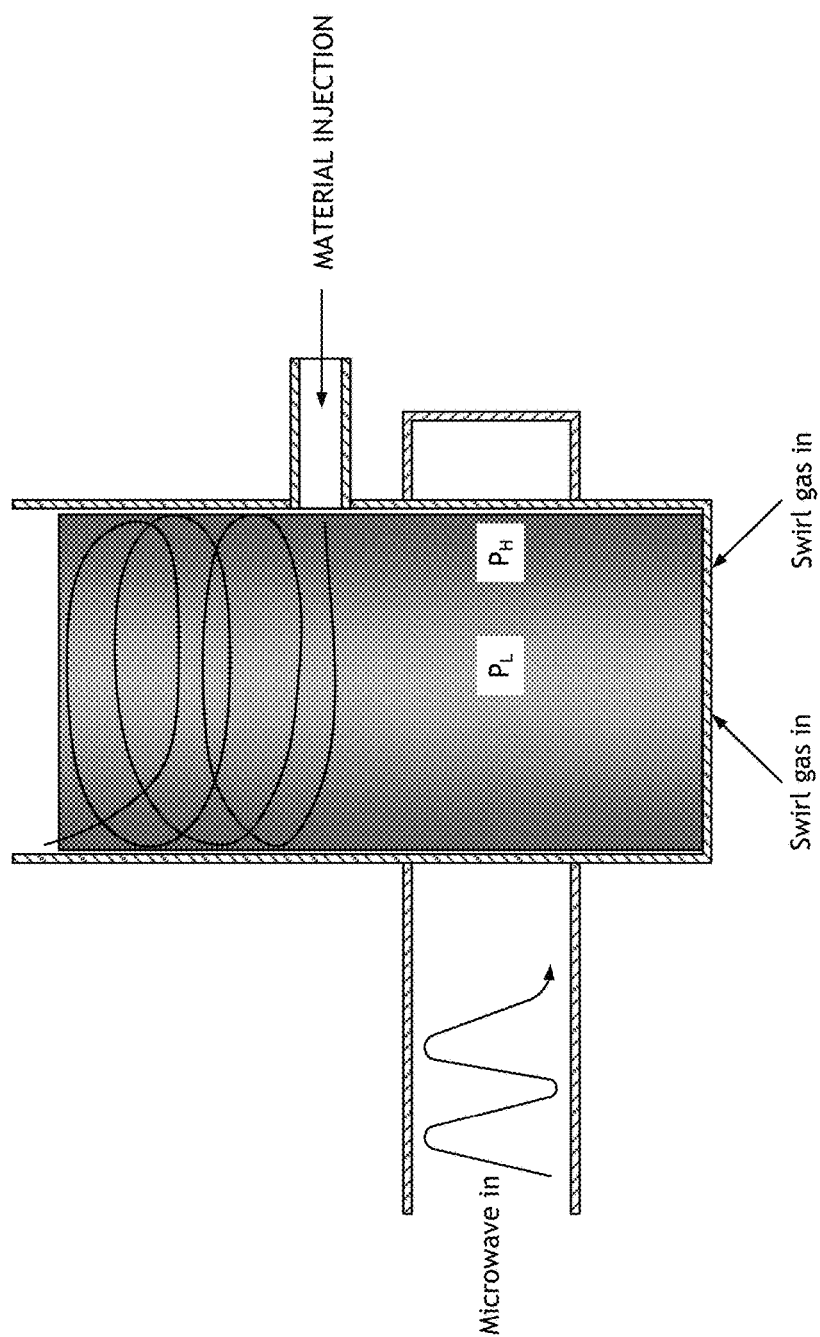

FIGS. 14A and 14B illustrate reaction progresses of a to-be-treated material when the to-be-treated material is injected into a discharge tube using a pressure lower than a pressure at a peak region of an electric field distribution in a convention approach and in the present disclosure respectively.

FIG. 14A illustrates reaction progresses of a to-be-treated material when the to-be-treated material is injected into a discharge tube using a pressure lower than a pressure at a peak region of an electric field distribution in a convention approach. The center region of the tube corresponds to the high pressure region $P_H$. The outer circumference of the tube corresponds to the low pressure region $P_L$. In this connection, the to-be-treated material is injected into the discharge tube using a pressure lower than the pressure $P_H$. As shown in FIG. 14A, the to-be-treated material enters into the center of the discharge tube and, immediately, move to the outer region (lower temperature region) and circles only around the outer region. That is, the reaction duration in which the to-be-treated material reacts using the high temperature region may be shortened. Thus, the reaction rate of the to-be-treated material may be lowered.

FIG. 14B illustrates reaction progresses of a to-be-treated material when the to-be-treated material is injected into a discharge tube using a pressure lower than a pressure at a peak region of an electric field distribution in the present approach. The center region of the tube corresponds to the low pressure region $P_L$. The outer circumference of the tube corresponds to the high pressure region $P_H$. In this connection, the to-be-treated material is injected into the discharge tube using a pressure lower than the pressure $P_H$. As shown in FIG. 14B, the to-be-treated material enters into the center of the discharge tube and move to the outer region (high temperature region) and circles around the outer region for a long time. In this connection, the outer region of the tube acts as the high pressure region and high temperature region to confine the to-be-treated material therein. This may lead to better reaction rate of the to-be-treated material. That is, the reaction duration in which the to-be-treated material reacts using the high temperature region may be longer. Thus, the reaction rate of the to-be-treated material may be raised.

The difference between the progresses of the to-be-treated material in FIG. 13B and FIG. 14B is based on whether to inject the to-be-treated material using the pressure lower or higher than the $P_H$. As shown in FIG. 13B, when the to-be-treated material is injected using the pressure higher than $P_H$, the to-be-treated material gradually moves to the high temperature region. As shown in FIG. 14B, when the to-be-treated material is injected using the pressure lower than $P_H$, the to-be-treated material rapidly moves to the high temperature region. Thus, the embodiment where the to-be-treated material is injected using the pressure lower than $P_H$ has a higher reaction rate than the embodiment where the to-be-treated material is injected using the pressure higher than $P_H$.

The to-be-treated material may be injected in a liquid, gas, or solid state. That is, the state of the to-be-treated material to be injected is not limited specifically.

Figure 10:
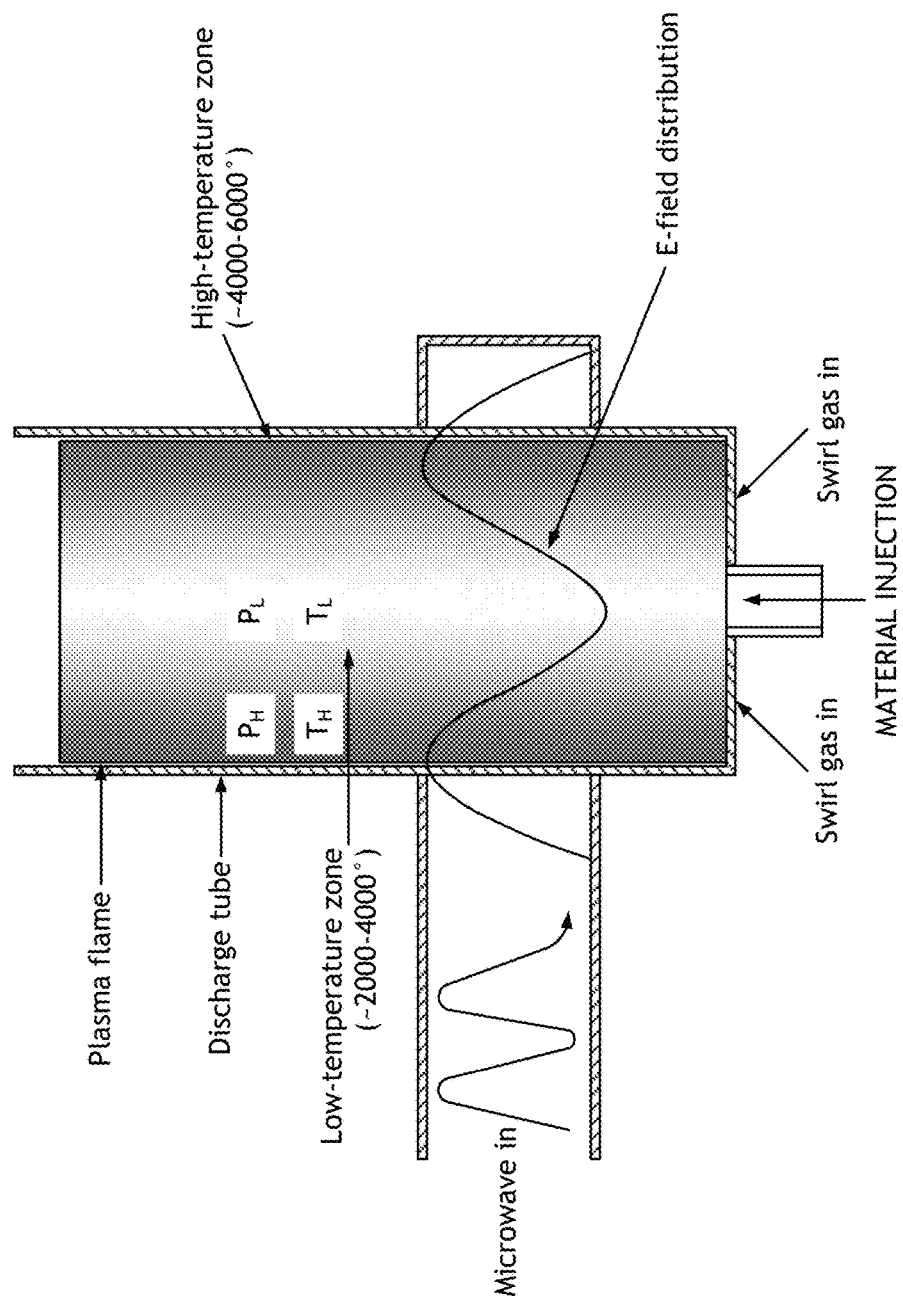
FIG. 10 illustrates a side elevation view showing a pressure and temperature gradient of a plasma torch in a discharge tube in accordance with one embodiment of the present disclosure.

FIG. 10 illustrates a side elevation view showing a pressure and temperature gradient of a plasma torch in a discharge tube in accordance with one embodiment of the present disclosure. As shown in FIG. 10, each of the plasma gas injector and to-be-treated material injector is oriented toward the longitudinal or transverse null line of the electric field distribution. Thus, the to-be-treated material is injected to the lowest electric field region such that the to-be-treated material bypasses the highest electric field region.

Figure 11:
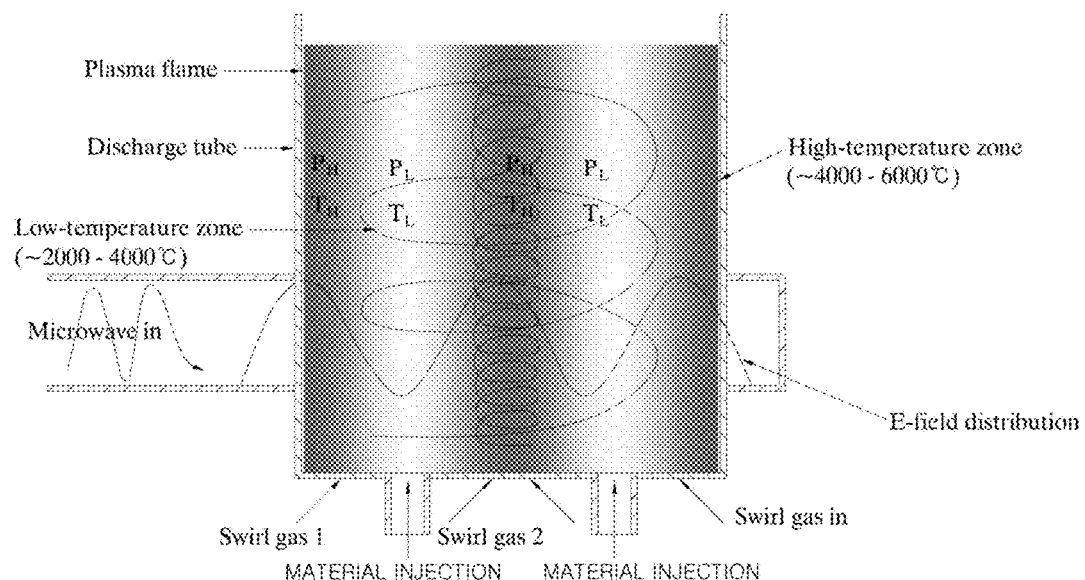
FIG. 11 illustrates a side elevation view showing a pressure and temperature gradient of a plasma torch in a discharge tube and injections of a to-be-treated material and swirled gas in accordance with another embodiment of the present disclosure.

FIG. 11 illustrates a side elevation view showing a pressure and temperature gradient of a plasma torch in a discharge tube and injections of a to-be-treated material and swirled gas in accordance with another embodiment of the present disclosure. In this embodiment, a'=3a. In this case, two lower pressure regions $P_L$ may be present. In this connection, two plasma gas injectors may be provided, and two to-be-treated material injectors may be provided. Thus, the two plasma gas injectors may be oriented toward the two lower pressure regions $P_L$ respectively. The two material injectors may be oriented toward the two lower pressure regions $P_L$ respectively. This may allow multi-swirl gas or material injections. The two plasma gas injectors may inject different gases. This may lead to improved reaction.

Figure 12:
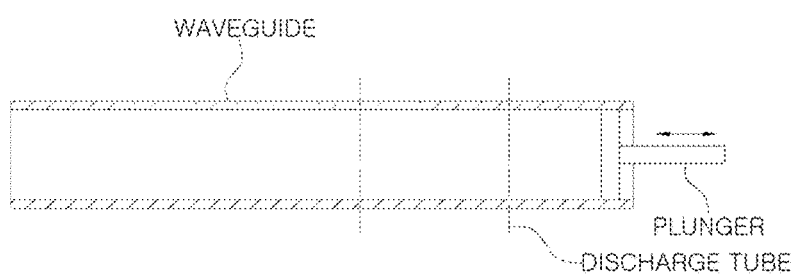
FIG. 12 illustrates a plunger fitted with a waveguide in accordance with a further embodiment of the present disclosure.

FIG. 12 illustrates a plunger fitted with a waveguide in accordance with a further embodiment of the present disclosure. The plunger may be fitted into the waveguide at the distal end thereof. The plunger may translate in the waveguide to adjust a maximum power coupling. In this way, the electric field distribution may be shifted to be adapted for the discharge tube.

In the conventional microwave plasma torch, the discharge tube is always positioned at a site $\lambda/4$ distant from the distal end of the waveguide. However, the present disclosure is not limited thereto. The position of the discharge tube may vary.

In one embodiment of the present disclosure, the microwave plasma torch system may include an ignition unit (not shown). In the conventional plasma torch, the ignition unit may be disposed at the center of the discharge tube because the center thereof has the highest temperature. In the present disclosure, the ignition unit may be disposed at the outer region of the discharge tube because the outer region thereof has the highest temperature. Thus, it may be advantageous that the ignition unit needs not being disposed at the center of the discharge tube.

As described above, the present microwave plasma torch system may enlarge the width of the waveguide and, hence, to enlarge the diameter of the discharge tube, thereby to realize the massive microwave plasma torch. This may overcome the limited plasma volume as in the conventional approach. Further, the present system may be applied to the vacuum, atmosphere pressure, and high pressure. The plasma gasification, waste gas purification or modification has been conducted in the limited high temperature area in the conventional approach. However, in the present disclosure, the plasma gasification, waste gas purification or modification has been conducted in the large high temperature area. Thus, the plasma gasification, waste gas purification or modification may be more efficiently conducted than in the conventional approach. All of gases applicable to the conventional torch may be equally applied to the present disclosure.

The above description is not to be taken in a limiting sense, but is made merely for the purpose of describing the general principles of exemplary embodiments, and many additional embodiments of this disclosure are possible. It is understood that no limitation of the scope of the disclosure is thereby intended. The scope of the disclosure should be determined with reference to the Claims. Reference throughout this specification to "one embodiment," "an embodiment," or similar language means that a particular feature, structure, or characteristic that is described in connection with the embodiment is included in at least one embodiment of the present disclosure. Thus, appearances of the phrases "in one embodiment," "in an embodiment," and similar language throughout this specification may, but do not necessarily, all refer to the same embodiment.

What is claimed is:

1. A microwave plasma torch system comprising:
a plasma generator;
a microwave generator configured to propagate a microwave to the plasma generator, the microwave having an electric field distribution arranged in at least two rows such that the electric field distribution comprises a longitudinal null line and a transverse null line; and
at least one plasma source gas injector configured to inject a plasma source gas to the plasma generator,
wherein the microwave generator includes a waveguide configured to propagate the microwave to the plasma generator,
wherein the plasma generator includes a discharge tube, wherein the discharge tube passes through the waveguide in a perpendicular to the waveguide,
wherein the waveguide has a width configured to render the arranged electric field distribution in the at least two rows in the waveguide width direction,
wherein the discharge tube is positioned relative to the waveguide such that a diameter center of the discharge tube encounters the longitudinal null line of the electric field distribution,
wherein the discharge tube is further positioned relative to the waveguide such that the diameter center of the discharge tube encounters the transverse null line of the electric field distribution, and wherein the transverse null line is perpendicular to the longitudinal null line.

2. The system of claim 1, wherein the plasma gas injector is oriented such the plasma gas therefrom is directed toward the longitudinal or transverse null line.

3. The system of claim 1, wherein the plasma gas is injected in a swirled form.

4. The system of claim 1, further comprising a further injector configured to inject a to-be-treated material into the discharge tube,
wherein the further injector is oriented such the material therefrom is directed toward the longitudinal or transverse null line.

5. The system of claim 1, wherein the at least one plasma gas injector comprises a plurality of plasma gas injectors, wherein each of the plurality of plasma gas injectors is oriented such the plasma gas therefrom is directed towards the longitudinal or transverse null line, wherein the plurality of plasma gas injectors inject different gases.

6. The system of claim 1, wherein the waveguide has a plunger fitted therein at a distal end thereof.

7. The system of claim 1, further comprising an ignition unit, wherein the ignition unit is aligned with a peak of the electric field distribution in the discharge tube.

8. The system of claim 1, further comprising a further injector configured to inject a to-be-treated material into the discharge tube, wherein the further injector is configured to inject the material into the tube using a pressure higher than a pressure at a peak of the electric field distribution in the discharge tube.

9. The system of claim 1, further comprising a further injector configured to inject a to-be-treated material into the discharge tube, wherein the further injector is configured to inject the material into the tube using a pressure lower than a pressure at a peak of the electric field distribution in the discharge tube.

* * * * *